United States Patent
Vuletić

[11] Patent Number: 5,453,115
[45] Date of Patent: Sep. 26, 1995

[54] PROCESS FOR COOLING AND CLEANING GAS, PARTICULARLY BLAST FURNACE OR PRODUCER GAS, CONTAINING ULTRAFINE PARTICLES, AND APPARATUS FOR PERFORMING THE SAME

[75] Inventor: Bogdan Vuletić, Düsseldorf, Germany

[73] Assignee: Deutsche Voest-Alpine Industrieanlagenbau GmbH, Dusseldorf, Germany

[21] Appl. No.: 158,443

[22] Filed: Nov. 29, 1993

[30] Foreign Application Priority Data

Nov. 30, 1992 [DE] Germany ............... 42 40 196.8

[51] Int. Cl.⁶ .................................................. B01D 47/00
[52] U.S. Cl. .................... 95/186; 55/223; 55/228; 55/233; 55/259; 55/267; 95/200; 95/202; 95/211; 95/225
[58] Field of Search ............ 55/223, 233, 257.7, 55/259, 267, 482, 228; 95/156, 186, 199, 200, 202, 211, 225, 277, 228

[56] References Cited

U.S. PATENT DOCUMENTS

| | | | |
|---|---|---|---|
| 2,598,116 | 5/1952 | Du Bois | 95/199 |
| 3,439,724 | 4/1969 | Mason | 55/223 |
| 3,456,709 | 7/1969 | Vegeby | 95/199 |
| 3,456,928 | 7/1969 | Selway | 55/223 |
| 3,465,504 | 9/1969 | Oropeza et al. | 55/259 |
| 3,475,881 | 11/1969 | Arnold et al. | 55/223 |
| 3,518,812 | 7/1970 | Kolm | 95/225 |
| 3,613,333 | 10/1971 | Gardenier | 55/223 |
| 3,704,570 | 12/1972 | Gardenier | 95/227 |
| 3,775,948 | 12/1973 | Beam | 55/257.7 |
| 3,957,464 | 5/1976 | Teller | 95/211 |

FOREIGN PATENT DOCUMENTS 2740039  3/1979  Germany ................. 55/223

*Primary Examiner*—C. Scott Bushey
*Attorney, Agent, or Firm*—Marshall & Melhorn

[57] ABSTRACT

A process for cooling and cleaning hot gas containing ultrafine particles exhausted from a coal gasification plant, a blast furnace, or the like. The process utilizes a vertical saturation stage to enrich the gas stream with water vapor and thereby saturate the ultrafine particles contained in the gas stream. The resulting mixture of particles, exhaust gas, water vapor, and water is then directed through a packing prewasher and then an annular clearance washer for removal of the particles through the rapid condensation of the water vapor. The water and particles are separated from the gas stream in several stages throughout the process resulting in a final gas exhaust stream with a significantly lower ultrafine particle content.

10 Claims, 1 Drawing Sheet

PROCESS FOR COOLING AND CLEANING GAS, PARTICULARLY BLAST FURNACE OR PRODUCER GAS, CONTAINING ULTRAFINE PARTICLES, AND APPARATUS FOR PERFORMING THE SAME

FIELD OF THE INVENTION

The invention relates to a process for cooling and cleaning hot gas containing ultrafine particles, such as producer gas produced in a melt-down gasifier in a coal gasification plant, or blast furnace gas from a melting reduction plant, in a packing prewasher and subsequently in an annular clearance washer, as well as to an apparatus for performing the process.

BACKGROUND OF THE INVENTION

Gases from a melting reduction plant or a coal/melt-down gasifier contain large quantities of ultrafine dust particles, i.e. dust particles having a size of approximately 1 micron, which can only be separated with very considerable difficulty in a wet washer using suitable washer types, such as annular clearance washers and accompanied by very high pressure losses or gas velocities, because they almost have the properties of a gas.

If use is not made of an added wetting agent for environmental protection reasons and due to the large quantities required, it is scarcely possible to obtain dust content values below 5 mg/m$^3$, (wherein m$^3$ is norm cubic meter or one cubic meter at 0° C. and 1.01325 bar; or 3×10$^{-7}$ pounds per cubic foot), even with high energy costs.

As the gas from the aforementioned plants is an export gas with a relatively high calorific value, which can be advantageously utilized in a gas combustion turbine with very high efficiency of approximately 46% for current generation purposes, the just content following washing should be below 5 mg/m$^3$.

SUMMARY OF THE INVENTION

The goal of the present invention is to so improve the aforementioned process, that the cleaned gas reaches a dust content of below 5 mg/Nm$^3$, without significantly increasing the energy costs necessary for performing the process.

The present invention utilizes a saturation washing stage upstream of a packing prewasher. The sensible heat of the gas stream in the saturation washing stage evaporates the supplied hot water thereby enriching the gas with steam to its saturation limit. The steam functions to wet the dust particles so that the subsequent condensation of the steam results in the removal of the particles from the gas.

Thus, the energy content of the hot gas, present in the form sensible heat is utilized for the evaporation of the added hot water. The evaporation of the hot water cools the gas stream and wets the ultrafine particles. The wetted particles are removed from the gas stream further on in the process in order to obtain a gas stream with significantly low particulate contamination.

According to an advantageous development in the saturation washing stage hot water at at least 60° C. is supplied for cooling the hot gas to the saturation point. Therefore the sensible heat of the gas is not significantly used for raising the temperature of the water as when adding initial water at approximately 30° C. and is instead used for its evaporation, so that the sought high steam content of the gas is obtained. Assuming a gas entry temperature of 300° C., a saturation point of 105° C. under an increased pressure of 2 bar, a hot water quantity of 1 liter with 70° C. per Nm$^3$ of gas and a heating of the water from 70° to 105° C., the steam content of the gas is increased by approximately 5%. In the case of the conventional use of cold water with a temperature of 30° C., theoretically steam is even condensed out. At a gas temperature of 500° C. and under otherwise identical conditions the steam content of the gas is increased by approximately 20%.

In the case of rapid condensing out of part of the steam in the packing washer and subsequently in the annular clearance washer and in contact with cold or cooler water, the wetted dust particles constitute condensation cells, so that they are also separated together with the droplets formed.

As a result of the procedure according to the invention the separation efficiency can be improved to such an extent that the desired dust content of below 5 mg/m$^3$ is reached.

Apart from increasing the steam content of the gas the long duration of the contact between the hot water, steam and dust particles in the saturation washing stage has a positive action on the washing effect. Therefore, according to an advantageous embodiment, the hot water is introduced into the line carrying away the hot gas close to the gas outlet of the gas-producing device.

According to a further, very advantageous embodiment the evaporation of the hot water takes place while the hot gas and the hot water in the saturation washing stage pass in the same flow direction through a vertically downwardly leading line. Advantageously, the height of the line for the hot gas entering at a relatively high level due to the gas outlet at the upper end of the gas-producing devices, is utilized in order to add the hot water at this high level, so that it flows through a considerable height of fall together with the hot gas. Thus, utilizing a given situation with limited space requirements, a long contact path is obtained, in which, under the action of the kinetic energy of the falling water and the gas velocity, the water is atomized and consequently the washing action is further improved. Preferably, the hot gas and the hot water are supplied through the vertical line to an annular clearance washer, in which a significant part of the dust particles wetted in the vertical line is separated.

According to an appropriate embodiment, the saturation washing stage is followed by two further cooling and washing stages. The final cooling and washing stage preferably being supplied with cleaned, cold water, which according to a further preferred development, following the traversing of said cooling and washing stage, is supplied to the central cooling and washing stage, so that a preheating occurs. In order to increase this effect, appropriately a large part of the water supplied to the central cooling and washing stage is supplied to the first saturation washing stage.

The advantageous, multiple use of the washing water leads to a reduction in the necessary initial water quantity and simultaneously to an increase in the return water temperature. A return water temperature increased by 10° C. and a lower circulating water quantity greatly reduces the solubility of the gases or the total dissolved gas quantity, so that far fewer gases and in particular highly toxic carbon monoxide are discharged together with the water from the system.

According to the invention, an apparatus for performing the described process having a packing washer located in the gas path and a following annular clearance washer are constructed in such a way that upstream of the packing prewasher there is a long, vertical, downwardly leading saturation pipe with an annular clearance washer located at the lower end of said pipe and whose outlet end issues below the packing of the packing washer.

According to an advantageous embodiment the final washing stage is followed by two series-arranged eliminator plates.

DESCRIPTION OF THE PREFERRED EMBODIMENT

Figure 1:
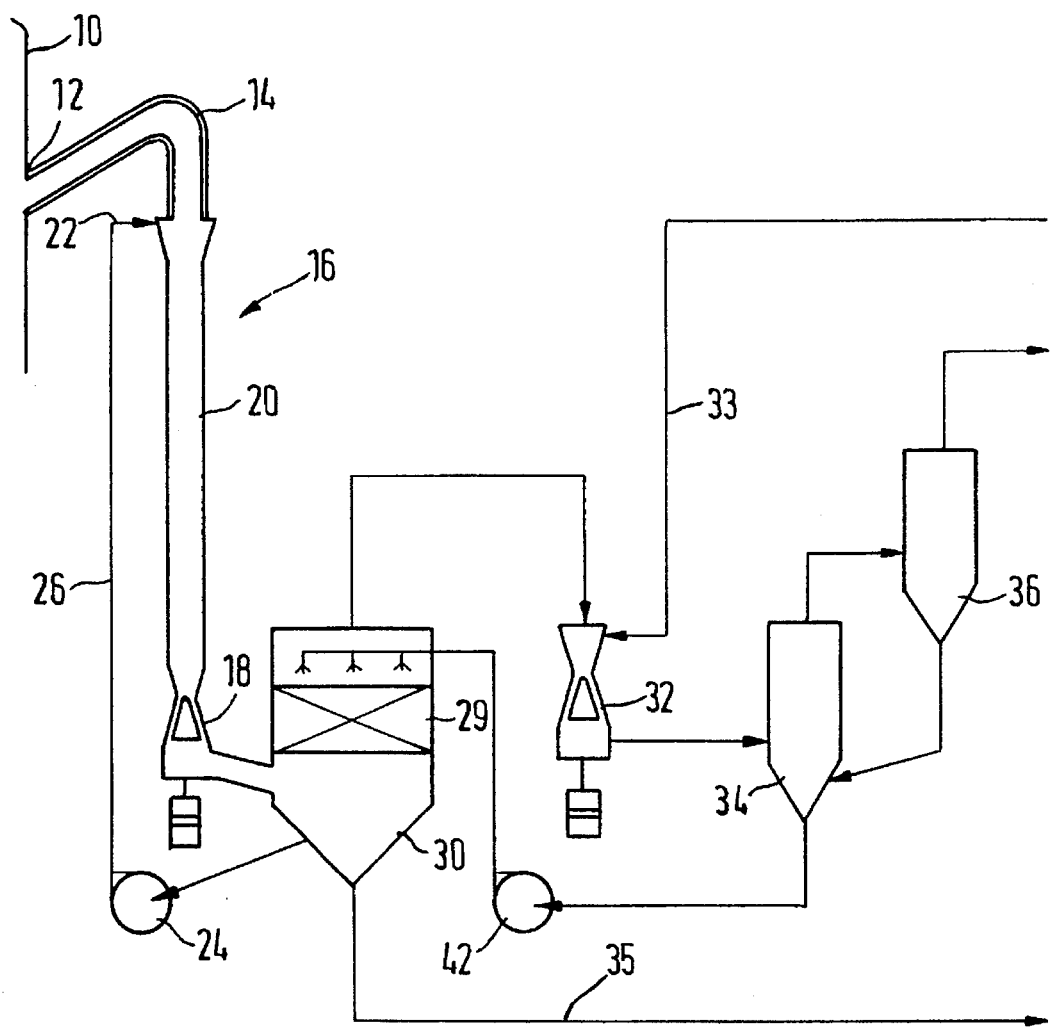

The invention is described in greater detail hereinafter relative to an embodiment and the attached drawing, which diagrammatically shows a means for performing the process according to the invention following onto a hot gas producer.

An only symbolically shown hot gas producer 10 is provided, close to its upper end, with a gas outlet 12, from which a bend 14 forms the connection to a saturation washing stage 16 in the form of a pipe 20, which leads vertically downwards to a first annular clearance washer 18. At the upper end of the pipe 20 is provided a hot water connection 22, to which is supplied via a pipe 26 from a hot water pump 24 hot water at e.g. 70° C. While the hot water flows in the same direction as the hot gas through the pipe 20, it removes sensible heat from said hot gas, so that a large quantity of steam is formed and the gas is at least approximately enriched with steam up to its saturation limit. Therefore, the ultrafine particles entrained by the gas are largely wetted and during the condensation of the water in the following stages act as nuclei for drop formation and can be separated together with the droplets in the condensate.

As a result of the kinetic energy of the water falling through the long pipe 20 and the action of the gas velocity, the water is atomized in the pipe 20, before at the lower pipe end it encounters the cone an annular clearance element of the washer 18, so that it contributes to the high separation efficiency of the annular clearance washer 18.

The mixture of gas, dust and water subsequently flows into the part of the packing washer 30 located below the packing 29 and in which the washing water preheated in the final cooling and washing stage is used as cooling and washing water. A large part of the steam contained in the gas is condensed out in the packing 29 and a further large part of the dust is separated here.

A hot water pump 24 delivers a part of the water in the meantime preheated to approximately 60° to 70° C. to the hot water connection 22 and the remainder of the water is supplied via the return line 35 to the treatment arrangement.

Just before the entry of the gas leaving the packing washer 30 with a relatively high steam content into the venturi gap of a second annular clearance washer 32, a large part of the cleaned, cold water supplied via a line 33 is formed under high pressure into fine particles, which in the venturi part of the annular clearance washer 32 are atomized into even finer particles or droplets by the very high gas velocity. Thus, there is a very intense contact between the dust and water particles, which are then separated in a following eliminator plate 34.

The very rapid condensing out of the steam in said washer assists the attachment of the dust particles to the water droplets and contributes to the increase in the separation efficiency of said washer 32.

The multiple use of the initial water can be positively utilized not only for increasing the washing effect of the gas washing system, in that the cold initial water is heated stepwise and partly evaporated in the first washing stage 16, but said operation also makes it possible to heat the washing water by at least 10° C. above the normal value and consequently to reduce by up to 30% the water quantity circulating, which not only greatly reduces the capital expenditure for the water treatment plant, but also significantly decreases the surface necessary for said plant.

If it is borne in mind that the surface area of the thickener alone for a 100 t/h pig iron plant is approximately 4000 $m^2$, it is clear which advantages result from the reduction of the thickener surface to 3000 $m^2$.

A small return water quantity with a higher return water temperature expels far less gas from the gas washing system operated under an overpressure, so that far less carbon monoxide is released in the vicinity of the water treatment plant.

An increase in the water temperature in the return line 35 from the standard 60° C. to 70° C., in the case of said gas producing plants does not lead to the usual hardness deposits and the like in the gas washing system, because the gases from the iron ore reduction plants have a high carbon dioxide content and under increased overpressure of approximately 2 bar, even in the hottest area, i.e. in the first washing stage 16 and the central washing stage 30, a large amount of carbon dioxide is dissolved in the water. As a result of the dissolving of carbon dioxide the hardness deposits from the water are avoided even at temperatures above 80° C., so that no special measures are required for the treatment of the added water. The use of the treated initial water for the final washing stage 32 indirectly contributes to an improved separation efficiency of the washer. As is known, a smaller part of the water droplets contained in the gas are not separated in the following eliminator plate 34, so that following the evaporation of these droplets in the following pipes, the solids contained in the water and dissolved salts are transformed into dust form. With low dust contents such as below 5 mg/$m^3$, this additional dust from water droplets can significantly increase the clean gas dust content. Therefore, in the apparatus according to the invention, the final washing stage 32 is followed by two series-arranged eliminator plates 34,36.

A further reason for the arrangement of a second eliminator plate 36 is that the gas from coal-based gas producing means contains small amounts of tar, which in permanent operation leads to accretions on the walls, which once again reduce the efficiency of separation of the eliminator plate. When the following eliminator plate 36 exists, this risk is much lower, because the gas arrives in an almost dry state and has a very low water droplet content. The water occurring at the first eliminator plate 34 is sprayed by means of a pump 42 above the packing 29 into the packing washer 30.

I claim:

1. A process for cooling and cleaning a hot gas stream containing ultrafine particles from an industrial furnace, said process comprising the steps of:

(a) directing a continuous hot gas stream containing ultrafine particles into an inlet of a vertical saturation washing stage, said saturation washing stage having a hot water inlet, a clearance washer, and an outlet;

(b) contacting said hot gas stream in said vertical saturation washing stage with hot water pumped through the hot water inlet, said hot gas substantially vaporizing the water to enrich the gas with steam and thereby reduce the temperature of said gas stream;

(c) saturating the ultrafine particles in said gas stream by flowing said gas stream and said hot water and steam through the clearance washer to improve the contacting of the particles with the steam and hot water, and to form a mixture of gas, steam, water, and wetted ultrafine particles;

(d) directing said mixture through the outlet of said saturation washing stage into a packing washer having a packed contacting area;

(e) rapidly condensing the steam in said packing washer by contacting said gas stream with water flowing through said packed contacting area, wherein the steam, water, and ultrafine particles are separated from said gas stream, said gas stream with remaining particles and steam directed out of said packing washer;

(f) increasing the velocity of said gas stream through a final washing stage while introducing cold water to rapidly condense any remaining steam and contact any remaining particles in said gas stream; and (g) separating the water and particles from said gas stream in an eliminator plate, emitting said gas stream to the atmosphere, and removing the water and separated particles from said eliminator plate and said packing washer.

2. The process according to claim 1, wherein the removal of the separated particles and water includes pumping the particles and water to a water treatment process.

3. The process according to claim 1, wherein the hot water pumped to the hot water inlet is at least 60° C., said hot water cooling said hot gas to the saturation point.

4. The process according to claim 1, wherein separating the water and particles from the gas stream includes flowing the gas stream through a second eliminator plate arranged in series with the first eliminator plate.

5. The process according to claim, 1 wherein the gas stream emitted to the atmosphere contains less than 5 mg/m$^3$ of particles at 0° C. and 1.01325 bar.

6. The process according to claim 1, including the additional step of wetting the packing washer with the particles and water removed from said eliminator plate.

7. The process according to claim 6, further comprising the step of recycling the water from said packing washer into the hot water inlet of said saturation washing stage thereby reducing the water and energy requirements for the process.

8. The process according to claim 1, wherein the contacting of the hot gas stream with hot water is done co-currently in said vertical saturation washing stage.

9. The process according to claim 1, wherein the cold water introduced in the final washing stage is atomized to improve the contact between the water and the particles.

10. The process according to claim 1, wherein the hot water inlet and the gas stream inlet in said vertical saturation washing stage are in close proximity to each other in order to increase the contact of said gas stream with the hot water and thereby improving saturation of said ultrafine particles.

* * * * *